United States Patent
Bulled et al.

(10) Patent No.: US 8,494,027 B2
(45) Date of Patent: Jul. 23, 2013

(54) WIRELESS COMMUNICATIONS DEVICE AND METHOD

(75) Inventors: Colin Ray Bulled, Exeter (GB); Serge Cresson, Gagny (FR)

(73) Assignee: Renishaw PLC, Wotton-under-Edge (*) Notice: Subject to any disclaimer, the term of this patent is extended or adjusted under 35 U.S.C. 154(b) by 185 days.

(21) Appl. No.: 12/734,400

(22) PCT Filed: Oct. 27, 2008

(86) PCT No.: PCT/GB2008/003642
§ 371 (c)(1),
(2), (4) Date: Apr. 29, 2010

(87) PCT Pub. No.: WO2009/056810
PCT Pub. Date: May 7, 2009

(65) Prior Publication Data
US 2010/0238977 A1    Sep. 23, 2010

(30) Foreign Application Priority Data
Oct. 30, 2007  (EP) ................................ 07356154

(51) Int. Cl.
*H04B 1/00* (2006.01)
(52) U.S. Cl.
USPC ....................................................... 375/132
(58) Field of Classification Search
USPC ....................................................... 375/132
See application file for complete search history.

(56) References Cited

U.S. PATENT DOCUMENTS

| | | | |
|---|---|---|---|
| 7,821,420 B2* | 10/2010 | Woollett et al. | 340/870.01 |
| 2003/0107475 A1 | 6/2003 | Bautista et al. | |
| 2005/0083177 A1* | 4/2005 | Willgert | 340/10.1 |
| 2007/0015465 A1 | 1/2007 | Giroud et al. | |
| 2007/0142020 A1 | 6/2007 | Rotzoll | |
| 2009/0046763 A1* | 2/2009 | Kerai | 375/136 |

FOREIGN PATENT DOCUMENTS

| | | |
|---|---|---|
| JP | A-08-139635 | 5/1996 |
| WO | WO 03/065289 A1 | 8/2003 |
| WO | WO 2004/057552 A1 | 7/2004 |
| WO | WO 2008/135717 A2 | 11/2008 |
| WO | WO 2008/135718 A1 | 11/2008 |

OTHER PUBLICATIONS

Pletcher, "A 65 µW, 1.9 GHz RF to Digital Baseband Wakeup Receiver for Wireless Sensor Nodes". Custom Integrated Circuits Conference (CICC), Sep. 2007.*

Siegemund, "Rendezvous layer protocols for Bluetooth-enabled smart devices", Springer, 2003.*

(Continued)

*Primary Examiner* — Juan A Torres
(74) *Attorney, Agent, or Firm* — Oliff & Berridge, PLC

(57) ABSTRACT

A wireless device is described that comprises a spread spectrum radio-frequency (RF) communications portion, such as a Bluetooth module, and an ancillary RF receiver portion. The spread spectrum RF communications portion is activated on receipt of a characteristic RF signal by the ancillary RF receiver portion. The ancillary RF receiver portion may consume substantially less power than the spread spectrum RF communications portion thereby allowing a low power standby mode to be implemented. The wireless device may be a measurement probe, such as a temperature probe, for use with machine tools and the like. An interface for transmitting the characteristic RF signal is also described.

16 Claims, 3 Drawing Sheets

OTHER PUBLICATIONS

Todd, "Low power rendezvous in embedded wireless networks." Proceedings of the First IEEE Annual Workshop on Mobile Ad Hoc Networking & Computing (MobiHOC), Boston, Massachusetts, Aug. 11, 2000.*

Johansson, "Rendezvous Scheduling in Bluetooth Scatternets", IEEE 2002.*

Nosovic, "Scheduled rendezvous and RFID wakeup in embedded wireless networks" IEEE International Conference on Communications, 2002, ICC 2002 vol. 5, on pp. 3325-3329 vol. 5.*

Hall et al., "RF Rendez-Blue: Reducing Power and Inquiry Costs in Bluetooth-Enabled Mobile Systems," IEEE (2000), pp. 640-645.

International Search Report mailed Jan. 27, 2009 in International Application No. PCT/GB2008/003642.

Written Opinion mailed Jan. 27, 2009 in International Application No. PCT/GB2008/003642.

European Search Report mailed Mar. 14, 2008 in European Application No. 07256154.0.

Aug. 1, 2012 Office Action issued in Chinese Patent Application No. 200880114061.3; with English-language translation.

Oct. 19, 2012 Office Action issued in Japanese Application No. 2010-531570 w/translation.

* cited by examiner

WIRELESS COMMUNICATIONS DEVICE AND METHOD

The present invention relates to wireless communication devices and in particular to a measurement probe for use with a machine tool that includes such a wireless communications device.

BACKGROUND OF THE INVENTION

Many types of wireless device are known in which data is transmitted and received over a radio-frequency (RF) communications link. For example, WI-FI (Registered Trademark) or frequency hopping spread spectrum communication systems, such as Bluetooth (Registered Trademark), are widely used for establishing wireless computer networks. It has also been described previously how a Bluetooth communications module can be activated by an associated low power receiver in the form of a radio-frequency identification (RFID) tag. For example, US2007/0015465 describes an electronic RFID tag that can be used to activate a Bluetooth module. Similar types of arrangement have also been proposed previously in US2003/107475 and WO03/065289.

In the field of metrology, it is also known to transmit measurement data from a battery operated measurement probe to an associated interface over a wireless RF link. The provision of such a wireless link is especially useful where the hardwiring of a measurement probe is inconvenient or simply not possible. For example, the use of a hardwired solution is simply impractical for measurement probes that are periodically loaded into the spindle of a standard machine tool using automated tool change apparatus or the like.

The wireless systems provided in the majority of commercially available measurement probes have, to date, tended to be based on fixed frequency transmission systems. However, bespoke spread spectrum communication systems have also been developed for such applications. An example of a spread spectrum radio system designed for use with a position measurement probe is outlined in WO2004/057552 (Renishaw plc). The system of WO2004/057552 uses a transmission protocol that is designed to provide reliable transmission of measurement probe data whilst ensuring clocks provided at the interface and measurement probe remain synchronised to ensure measurement accuracy.

Providing wireless measurement probes overcomes the problems associated with hardwiring, but introduces the requirement to periodically replace or recharge the batteries of the measurement probe. Taking a machine tool off-line to change the batteries of a measurement probe can be disruptive to a production process and also requires the intervention of a machine operator. WO2004/057552 describes how the spread spectrum radio module of the battery operated measurement probe can operate in either a normal mode or a power saving mode in which the rate of transmission of the regular signals is reduced. Although the battery power consumed by such a system when placed in standby mode is low, it is not negligible and battery life can therefore still be an issue.

SUMMARY

According to a first aspect of the invention, a wireless device comprises; a spread spectrum radio-frequency (RF) communications portion for transmitting and/or receiving data using a plurality of frequency channels; and an ancillary RF receiver portion for receiving an RF signal across a frequency range that encompasses a plurality of the frequency channels used by the spread spectrum radio-frequency (RF) communications portion, the ancillary RF receiver portion comprising a processor for analysing the received RF signal to determine if a characteristic RF signal has been received, wherein the spread spectrum RF communications portion is activated on receipt of a characteristic RF signal by the ancillary RF receiver portion.

The present invention thus provides a wireless device, such as a battery operated mobile measuring device, having a spread spectrum RF communications portion that transmits and/or receives data using a plurality of frequency channels that are typically contained with a certain frequency band. The spread spectrum RF communications portion may allow, for example, a frequency hopping spread spectrum communications link (such as a Bluetooth link) to be established with a remote interface or station. Although the spread spectrum communications link allows measurement data or the like to be passed to a remote interface at a high data transfer rate, such a spread spectrum RF communications portion typically consumes a significant amount of electrical power. If data transfer is only required periodically (e.g. whilst taking temperature measurements of an object prior to a machining process), continually powering the spread spectrum RF communications portion even when there is no requirement to pass data to or from the associated interface wastes a significant amount of battery power.

The wireless device of the present invention thus comprises an ancillary RF receiver portion which, as described in more detail below, preferably consumes significantly less power than the spread spectrum RF communications portion. The ancillary RF receiver portion listens for a characteristic RF signal (i.e. a "start" signal) across a frequency range or band that encompasses a plurality of the frequency channels used by the spread spectrum RF communications portion and activates the spread spectrum RF communications portion on receipt of such a start signal. In this manner, the low power ancillary RF receiver portion can be used to activate the spread spectrum RF communications portion only when data transfer is actually required.

A wireless device of the present invention thus has the advantage that a high data rate communications link can be established whenever necessary, but that a low power "standby" or "sleep" mode can otherwise be entered in which the device continually monitors for the presence of a characteristic RF signal (a so-called start signal) such that the spread spectrum communications link can be remotely activated whenever required. The present invention thus combines the high data transfer rates of a spread spectrum RF communications link with the ability to provide a low power consumption standby mode when no data transfer is needed. A device of the present invention thus has the advantage of providing an increased interval between battery changes, especially for measurement devices or the like that are only used intermittently.

The device of the present invention is also advantageous over known combined Bluetooth and RFID systems of the type mentioned above. Instead of providing an RFID tag that operates completely separately from the Bluetooth module (e.g. at a different frequency) and hence requires a separate transmitter in the associated interface, the device of the present invention employs a passive receiver that simultaneously receives an RF signal across multiple frequency channels that are also used by the spread spectrum RF communications link. A device of the present invention thus requires fewer electrical components, and is simpler to implement, than the combined Bluetooth and RFID devices mentioned above. Similarly, the associated interface for transmitting the characteristic RF signal to a device in accordance with the present invention requires fewer components than would be required for the prior art Bluetooth/RFID systems.

As outlined above, the spread spectrum radio-frequency (RF) communications portion transmits and/or receives data using a plurality of frequency channels. In other words, the spread spectrum radio-frequency (RF) communications portion transmits and/or receives RF signals that each fall within the frequency range of one of the selected frequency channels. The spread spectrum radio-frequency (RF) communications portion conveniently implements frequency hopping across the plurality of frequency channels, thereby only transmitting or receiving data over a single channel at any one time; i.e. the spread spectrum RF communications portion may comprise a frequency hopping spread spectrum RF communications portion. The spread spectrum RF communications portion is advantageously a Bluetooth compliant device; i.e. it may comply with the Bluetooth standard. Alternatively, the spread spectrum RF communications portion could be a bespoke communications module of the type described in WO2004/057552.

As mentioned above, a frequency hopping spread spectrum RF communications portion, such as a Bluetooth module, transmits and receives data using a plurality of frequency channels within a frequency band. In particular, Bluetooth hops between seventy-nine frequency channels within the 2.4 GHz band. If the spread spectrum RF communications portion implements such frequency hopping, the ancillary RF receiver portion may simultaneously receive a plurality or all signals within the frequency band. In other words, the ancillary RF receiver portion conveniently does not implement any kind of frequency hopping but instead simultaneously receives on all channels; this reduces the power consumption requirements of the receiver.

Conveniently, the power consumption of the ancillary RF receiver portion is less than the power consumption of the spread spectrum RF portion. Preferably, the power consumption of the ancillary RF receiver portion is less than the power consumption of the spread spectrum RF portion by a factor of at least ten, more preferably by a factor of at least fifty, more preferably by a factor of at least one hundred.

Advantageously, the ancillary RF receiver portion is a low power portion that conveniently comprises only a receiver (i.e. not a transmitter). Advantageously, the ancillary RF receiver portion draws an electrical current of less than 500 µA, more preferably less than 400 µA, more preferably less than 300 µA, and more preferably less than 200 µA. The ancillary RF receiver portion conveniently comprises a passive front-end receiver circuit. A low power amplifier may also be advantageously provided to amplify the received signal. The ancillary RF receiver portion may also include a band pass filter.

The wireless device may be battery operated and thus preferably comprises at least one battery. The at least one battery may be replaceable and/or rechargeable as required. The battery is conveniently connected to the spread spectrum RF communications portion via an activation switch. In such a device, the ancillary RF receiver portion preferably provides, on receipt of the characteristic RF signal, a control signal that causes the activation switch to close thereby connecting the spread spectrum RF communications portion to the battery. The processor of the ancillary RF receiver portion may analyse the received signal and provide the control signal for closing the activation switch. In this manner, the spread spectrum RF communications portion draws no power whilst the device is in standby mode.

The at least one battery may also power the ancillary RF receiver portion. The ancillary RF receiver portion may be continually powered or it may only be powered when the spread spectrum RF communications portion is inactive. In other words, the ancillary RF receiver portion may be powered down whenever the spread spectrum RF communications portion is active. The device may optionally comprise a manual "off" switch to completely power down all electrical components of the device.

The spread spectrum RF communications portion and the ancillary RF receiver portion may be connected to separate antennas. It is, however, preferred that the spread spectrum RF communications portion and the ancillary RF receiver portion share a common antenna. To implement sharing of a single antenna, a signal routing switch is preferably provided. Any signal received by the antenna may then be routed via the signal routing switch to either the spread spectrum RF communications portion or the ancillary RF receiver portion as required. The processor of the ancillary RF receiver portion, if provided, may control operation of the signal routing switch.

The spread spectrum RF communications portion advantageously comprises a transmit circuit and a receive circuit such that a two-way communications link with a remote interface can be established. Although a common antenna may be provided, it is important to again note that the receive and transmit circuits of the spread spectrum RF communications portion are preferably separate from the receive electronics of the ancillary RF receiver portion. As outlined above, the ancillary RF receiver portion preferably comprises only a receiver and not a transmitter.

Advantageously, the spread spectrum RF communications portion (when active) is switchable between a plurality of different modes of operation. For example, the spread spectrum RF communications portion may have a listening mode in which only the receive circuit is activated. A full communications mode may also be provided in which both the receive and transmit circuits are activated thereby permitting a full spread spectrum communications link with a remote interface to be established. Advantageously, the spread spectrum RF communications portion initially enters the listening mode when activated. The full mode may then be entered if an appropriate instruction (which may comprise a code that is recognised only by the required device) is received over the spread spectrum communications link.

Once activated, the spread spectrum RF communications portion may be deactivated after one or more predetermined criteria are met. For example, the spread spectrum RF communications portion may be deactivated after a certain period of non-use of the spread spectrum RF communications portion. If the spread spectrum RF communications portion has entered a listening mode as described above, it may become deactivated if no appropriate instruction is received from the associated interface within a certain period of time. If the spread spectrum RF communications portion has been used to transfer data to a remote interface, it may be deactivated after a certain amount of data has been transmitted, when no data has been collected for a certain period of time or when instructed by the interface that no further data is required in the immediate future. A processor may be provided as part of the device to assess when the criteria for deactivation of the spread spectrum RF communications portion has been met; such a processor may be part of the ancillary RF receiver portion as described above or a part of the spread spectrum RF communications portion.

Advantageously, the device comprises at least one measurement sensor. The spread spectrum RF communications portion may then be arranged to transmit data acquired by the measurement sensor to an associated interface. Conveniently, the at least one measurement sensor comprises one or more temperature sensors; for example, the device may comprise a spindle mounted temperature probe or a pallet mountable hub linked to a plurality of temperature sensors. The at least one measurement sensor may alternatively comprise a position measurement sensor. For example, the device may be a contact measurement probe, such as a touch trigger probe or a scanning (analogue) probe, or a non-contact measurement probe. If timing is critical, the device may include a clock (which may be synchronised with a clock on the associated interface) so that the time of each measurement can be accurately determined.

Advantageously, an interface may also be provided for communicating with a wireless device of the type described above. The interface is preferably operable in a spread spectrum communications mode (e.g. in which data is transmitted and/or received using a plurality of frequency channel) and a start mode. Conveniently, a characteristic RF signal (i.e. a signal that will be recognised by the ancillary RF receiver portion of wireless device) is transmitted by the interface when operating in the start mode. The characteristic RF signal may be transmitted by the interface over a plurality of the frequency channels used in the spread-spectrum communications mode. The interface may also comprise a controller that causes switching between the spread spectrum communications mode and the start mode as required. To increase the range of wireless device activation, the interface may comprise a power amplifier. Advantageously, the power amplifier only boosts the power of the RF signal that is transmitted by the interface when the interface is operating in the start mode (i.e. the power amplifier preferably does not act upon the RF signal generated when the interface is in the spread spectrum communications mode).

The characteristic RF signal transmitted by the interface and received by the ancillary RF receiver portion may take any form. Conveniently, a repetitive pattern is used to simplify the processing required to recognise the signal. For example, the characteristic RF signal may comprise a periodically repeating pattern of RF pulses. To avoid unwanted device activations, the characteristic RF signal preferably comprises a pattern that is unlikely to arise from other communication systems operating in the same environment. For example, the pattern is preferably distinguishable from normal Bluetooth and WIFI data traffic.

A kit may also be advantageously provided comprising a wireless device and interface as described above.

Also described herein is a method of wireless device operation, comprises the steps of; (a) taking a wireless device comprising a spread spectrum radio-frequency (RF) communications portion and an ancillary RF receiver portion; (b) taking an interface for communicating with the wireless device; and (c) transferring data between the spread spectrum RF communications portion of the wireless device and the interface over a spread spectrum RF link; wherein the method comprises the step of activating the spread spectrum RF communications portion to perform step (c) when the ancillary RF receiver portion has received a characteristic RF signal.

Also described herein is a wireless device comprises a spread spectrum radio-frequency (RF) communications portion and an ancillary RF receiver portion, wherein the spread spectrum RF communications portion is activated on receipt of a characteristic RF signal by the ancillary RF receiver portion. Such a device may have any of the additional features described above.

Also described herein, is a wireless RF device that comprises a receiver operable to receive RF signals in a frequency hopping receive mode and a standby receive mode, wherein the receiver when placed in standby receive mode does not implement frequency hopping and consumes less power than the frequency hopping receive mode, wherein the receiver switches from the standby receive mode to the frequency hopping receive mode on receipt of a characteristic RF signal.

The invention will now be described, by way of example only, with reference to the accompanying drawings in which;

DETAILED DESCRIPTION

Figure 1:
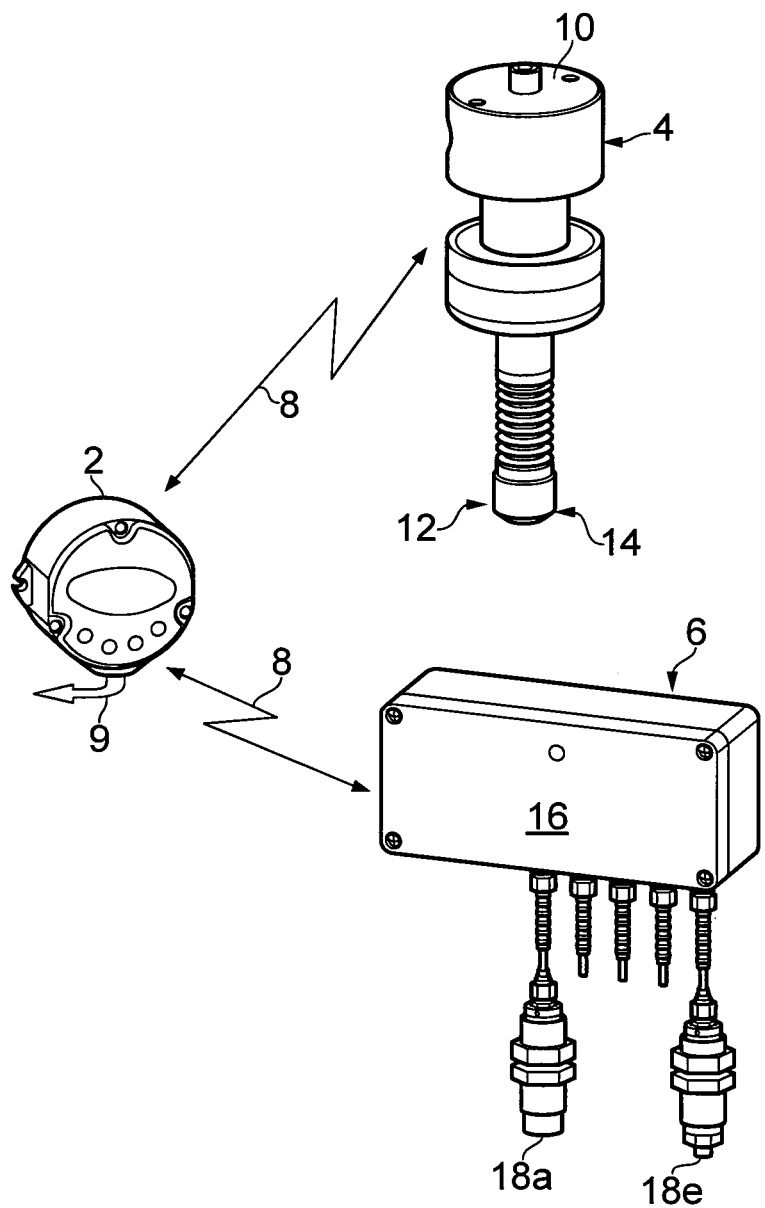
FIG. 1 illustrates a temperature measurement system of the present invention including fixed and spindle probes and an associated interface.

Referring to FIG. 1, a temperature measurement probe system according to the present invention is illustrated. The system comprises an interface 2, a spindle mountable temperature probe 4 and a fixed temperature probe assembly 6.

The interface 2 is configured to communicate with the spindle mountable temperature probe 4 and the fixed temperature probe assembly 6 over a Bluetooth (Registered Trademark) communications links 8 whenever temperature data are required. The Bluetooth communications standard is a frequency hopping spread spectrum radio link that is well known to those skilled in the art and is referred to as Bluetooth herein. The interface 2, spindle mountable temperature probe 4 and fixed temperature probe assembly 6 thus each contain a Bluetooth communications module or portion which is described in more detail below. The interface 2 also comprises a hardwired communications link 9 for communicating with an associated machine tool controller or control computer (not shown).

The spindle probe 4 comprises a proximal end 10 that can be attached to a shank that can, in turn, be releaseably mounted in the spindle of a machine tool. The distal end 12 of the spindle probe 4 comprises a temperature sensor 14. In use, the machine tool loads the spindle probe 4 into its spindle and moves the spindle so that the temperature sensor 14 is brought into contact with an object (e.g. a workpiece) to be measured. Temperature data collected from the object are then passed from the spindle probe 4 to the interface 2 over the Bluetooth link and then passed on to the machine tool controller. The machine tool controller may also provide control signals to the spindle probe 4 via the interface 2 using the Bluetooth link; for example, such a control signal may instruct the spindle probe to start collecting temperature data.

The fixed temperature probe assembly 6 comprises a control box or hub 16 to which a plurality of temperature sensors 18a and 18e are connected by wires. The control box may, for example, be attached to a pallet and the temperature sensors may be affixed to different parts of an article (e.g. an engine block, etc.) located on that pallet. In this manner, the temperature of different parts of the article may be measured when required. In particular, such an arrangement may be used to monitor the temperature of the article during a multi-stage machining process such that the parameters used during the machining process can take into account the temperature of the article. The temperature data acquired by each temperature sensor 18*a* and 18*e* is determined-by the control box 16 and passed to the interface via the Bluetooth link. The fixed temperature probe assembly 6 may periodically transmit temperature data or it may collect and transmit temperature data on receipt of a request from the machine tool controller via the interface 2.

Any type of temperature sensor may be used in the above system. However, a suitable temperature sensor is described in more detail in Applicant's co-pending European patent application No 07356060.9. The method of rapid temperature measurement described in Applicant's co-pending European patent application No. 07356061.7 may also be used in the system. The contents of these documents are hereby incorporated herein by reference.

The interface 2 is hardwired to, and receives electrical power from, the machine tool controller. The interface 2 may thus be considered a fixed station. The spindle mountable temperature probe 4 and the fixed temperature probe assembly 6 are mobile or wireless stations powered by internal batteries; hardwiring such stations to a power supply is simply impractical. As discussed above, the replacement of batteries and/or the failure of wireless measurement equipment due to exhausted batteries is problematical for automated production processes. It is thus desirable to maximise battery life thereby minimising the necessity for battery replacement.

Although it is known to provide Bluetooth communication modules that can operate in a full (transmit/receive) mode or a listening (e.g. receive only) mode, the listening mode still employs a frequency hopping receiver and thus expends substantially the same amount of power as operation in full mode. If data is only required from a mobile station occasionally (e.g. during a pre-machining temperature measurement stage), the use of the listening mode during prolonged periods of non-use can drain the battery relatively quickly. For example, a typical Bluetooth communications module operating in full or listening mode draws a current of 13 mA from the battery. For a spindle probe including two 3.6V batteries having a total capacity of 1.0 A/h, the power would be exhausted within about 60 hours.

The present invention, which will now be described in more detail with reference to FIGS. 2 and 3, overcomes the drawbacks associated with expending power whilst no measurements are being acquired by providing each mobile station with a parallel or ancillary RF receiver portion that has a low power consumption. The Bluetooth communication module is thus able to be completely powered down when no data transmission is required and the ancillary RF receiver portion is arranged to activate or awaken the Bluetooth communication module when measurement data from the mobile station is next required. In particular, the ancillary RF receiver portion is arranged to cause the Bluetooth communication module to power-up when it receives a characteristic RF signal from the interface.

Figure 2:
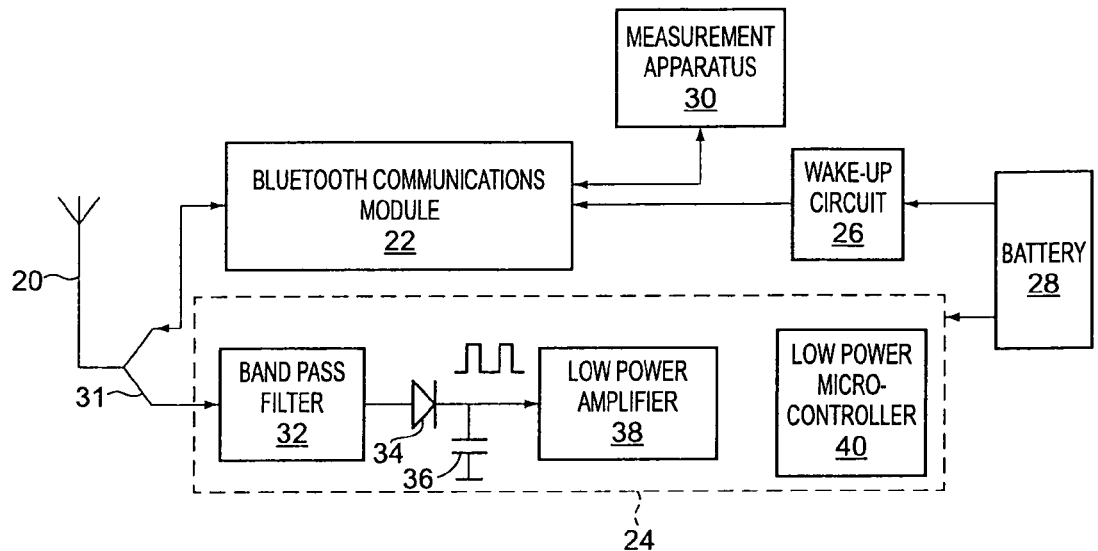
FIG. 2 is a schematic illustration of the communication electronics of a probe of the present invention.

Referring to FIG. 2, the RF communication electronics of a wireless or mobile measurement device (e.g. a spindle mounted probe or a measurement assembly) of the present invention are illustrated in more detail. The wireless device comprises an antenna 20, a Bluetooth communications module 22, an ancillary RF receiver portion 24, a wake-up circuit 26, a battery 28 and measurement apparatus 30. A switch 31 is also provided to connect either the Bluetooth communications module 22 or the ancillary RF receiver portion 24 to the antenna 20.

The Bluetooth communications module 22 is of known type; for example, an LMX9820A chip produced by National Semiconductors, CA, USA may be used. The wake-up circuit 26 controls the supply of electrical power from the battery 28 to the Bluetooth communications module 22 such that the Bluetooth communications module 22 can be activated (powered) and deactivated (i.e. unpowered) as required. If the Bluetooth communications module 22 is active, the switch 31 is configured so that the Bluetooth communications module 22 is connected to the antenna 20. If the Bluetooth communications module 22 is inactive (i.e. the device is in sleep mode), the switch 31 is configured so that the ancillary RF receiver portion 24 is connected to the antenna 20.

The ancillary RF receiver portion 24 comprises a 2.4 GHz band pass filter 32, a diode 34 and grounded capacitor 36 that collectively provide a passive front end receiver circuit. The signal from the passive front end receiver circuit is passed to an (optional) low power amplifier 38 and the amplified signal is fed to a low power micro-controller 40. The micro-controller 40 is arranged to monitor the received RF signal to determine if a certain characteristic RF signal has been received. A suitable form of characteristic RF signal, which is readily distinguishable from standard Bluetooth communication signals, is described in more detail below with reference to FIG. 4*a*.

On recognition of the specified characteristic RF signal, the micro-controller 40 issues a control signal to the wake-up circuit 26 which activates the Bluetooth communications module 22. The wake-up circuit 26 may also be considered to be an activation switch that connects the Bluetooth communications module 22 to the battery on receipt of an appropriate control signal from the ancillary RF receiver portion 24. The Bluetooth communications module 22, when active, can exchange data with an associated interface. If and when required, the Bluetooth communications module 22 can also receive data from the measurement apparatus 30 and transmit that data to the associated interface over the Bluetooth link. Such data transmission may occur periodically or on request of the interface. The Bluetooth communications module 22 may become deactivated (i.e. re-enter sleep mode) after a certain amount of time has elapsed since the last transmission of measurement data or on receipt of an appropriate instruction from the interface over the Bluetooth communication link.

It should be noted that the Bluetooth communications module 22 will, when communicating with the Bluetooth communications module of an associated interface, frequency hop between eighty different frequency channel in the 2.4 GHz band. The ancillary RF receiver portion 24 does not frequency hop in this manner but instead receives in parallel across all eighty channels within the 2.4 GHz band. This greatly reduces the complexity and power consumption of the ancillary RF receiver portion compared with the frequency hopping receiver electronics of the Bluetooth communications module.

The ancillary RF receiver portion 24 illustrated in FIG. 2 has been found to consume around 130 µA of electrical power. For a battery having a capacity of around 1 A/h, which is typical for a spindle mounted probe, the ancillary RF receiver portion can thus be continuously powered for around 320 days. This can be seen to be a significant improvement to the 60 hours of battery life that would be obtained if the Bluetooth communication module was continuously powered. For a measurement assembly having battery capacity of around 3 A/h, the ancillary RF receiver portion can be continuously powered for around three years. Power consumption in sleep mode thus becomes almost negligible and battery life is mainly dictated by how long the measurement device is actively acquiring and transmitting measurement data.

In the majority of practical circumstances, a number of wireless communication devices of the type described above will be within range of an interface that transmits the characteristic RF signal. Although it may be desired to communicate with only one of these devices, the Bluetooth communication modules of all such in-range devices will be activated if the associated ancillary RF receiver portion receives the characteristic RF signal. To allow only the required wireless device (s) to be fully activated, the Bluetooth communications module 22 is operable in two different modes; a listening (receive only) mode and a full (transmit and receive) communications mode.

On activation, the Bluetooth communications module 22 enters the listening mode and the ancillary RF receiver portion 24 is deactivated. After transmitting the characteristic RF signal (i.e. the "start" signal), the Bluetooth communications module of the interface requests a communication from the Bluetooth communications module 24 of the required wireless device. The Bluetooth communications request will include a unique code that is only recognised by the required mobile device. The required mobile device will, on receipt of the code, enter full communications mode and exchange data with the interface whilst any mobile devices that are not required by the interface will not receive their code and will thus not enter the full communications mode. The Bluetooth communications module of the mobile devices are thus arranged to automatically deactivate themselves if they are not requested to enter the full communication mode within a certain period of time after receipt of the start signal or if a code is received that is intended to activate a different device. In this manner, any one mobile device can be selectively activated by the interface and all other mobile devices in range are awakened for a short time (in listening mode) before re-entering sleep mode.

Figure 3:
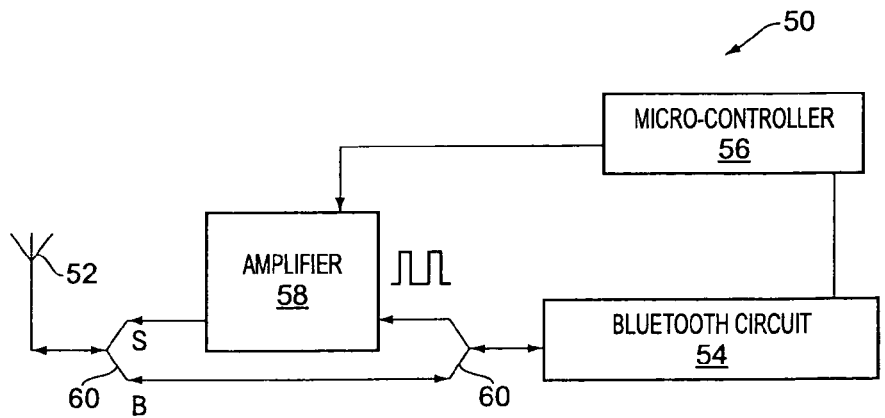
FIG. 3 is a schematic illustration of the interface electronics for communication with a probe of the type shown in FIG. 2.

Referring to FIG. 3, an interface 50 suitable for communicating with a device of the type described with reference to FIG. 2 is illustrated.

The interface 50 comprises an antenna 52, a Bluetooth circuit 54, a micro-controller 56 and a 100 mW amplifier 58. A pair of switches 60 are also provided to allow the amplifier 58 to be switched into, or out of, the signal path between the Bluetooth circuit 54 and the antenna 52. The Bluetooth circuit 54 and switches 60 operate under the control of the micro-controller 56. The interface is not battery operated but receives electrical power from a mains supply, optionally via the associated machine tool.

The interface 50 can be operated in a Bluetooth (B) mode or in a start (S) mode. In Bluetooth mode, the Bluetooth circuit 54 of the interface 50 is connected directly to the antenna 52 and normal Bluetooth, frequency hopping, communications can be established with associated Bluetooth devices. In start mode, the micro-controller 56 causes the Bluetooth circuit 54 to generate a characteristic RF signal or start pattern. As described in more detail below, the start pattern is selected to be a pattern of RF pulses that would not be generated during normal Bluetooth operation. The Bluetooth circuit 54 keeps frequency hopping when generating the start pattern to avoid frequency collision effects at the receiver. In start mode, the amplifier 58 is also switched "in-line" to boost the output signal intensity to around 100 mW. It should be noted that although the amplifier increases the switch-on range (e.g. from several metres to several tens of metres), it is by no means essential. In fact, the amplifier 58 may have to be omitted or provide less amplification if this is necessary to comply with local radio emission regulations.

In use, the interface 50 can thus enter a start mode in which the start pattern or characteristic RF signal is transmitted for around one second to awaken any associated wireless devices that are in range. The Bluetooth communication modules of any suitable wireless devices in range will be activated on receipt of the start pattern and will enter their listening mode. After transmitting the start signal, the interface enters normal Bluetooth mode and requests a communication from the selected wireless measurement device. Only the required wireless device responds to the Bluetooth communication request issued by the interface and enters the Bluetooth full communication mode. If any other wireless device have received the start signal, they re-enter sleep mode after a short period of time. Data can then be passed from the activated wireless device to the interface. Once data is no longer needed from the activated wireless device, the interface may issue an instruction for that device to re-enter sleep mode by deactivating its Bluetooth communications module.

Figure 4A:
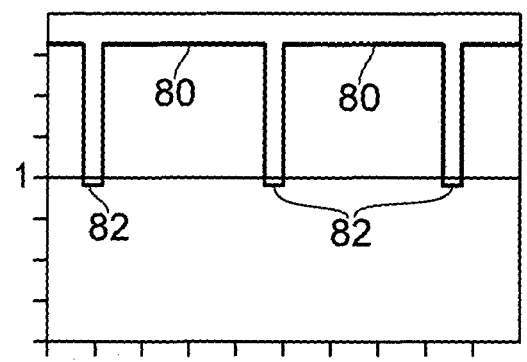
FIGS. 4a-4c shows examples of the type of signals received by an ancillary RF receiver portion of the present invention.

Referring to FIG. 4a, a suitable start or characteristic RF signal is illustrated. In particular, the plot of FIG. 4a illustrates the signal that is received across the 2.4 GHz frequency band by the ancillary RF receiver portion of a wireless device of the type described with reference to FIG. 2 above. The characteristic RF signal can be seen to comprise long RF pulses 80 of similar duration interspersed with short periods 82 of no transmission. As explained above, the micro-controller 40 of the ancillary RF receiver portion is arranged to monitor the received RF signal to ascertain when such a characteristic RF signal has been received.

Figure 4B:
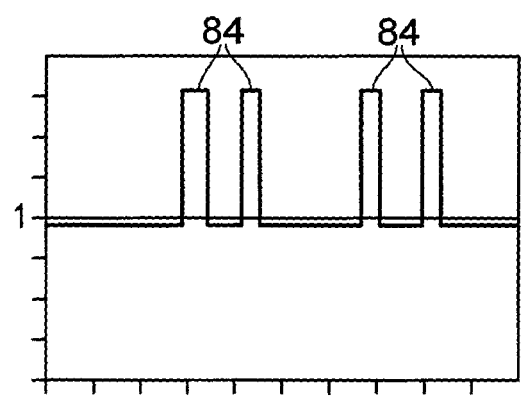
Figure 4C:
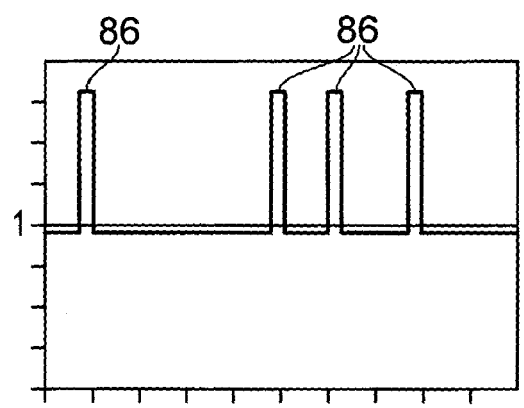

Referring to FIGS. 4b and 4c, standard Bluetooth and WI-FI communication signals respectively are shown. It can be seen that the irregularly spaced pulses 84 and 86 of FIGS. 4b and 4c can be readily distinguished from the start pulse of FIG. 4a. It should also be noted that FIG. 4a is only one example of a characteristic RF signal that can be used as a start signal. Many variants could be used; the only requirement is that the pattern of such a start signal does not typically occur during normal communication.

It is important to note that although a Bluetooth based communications architecture is described in detail above, any spread spectrum radio communications module could be used instead. For example, the invention could also be applied to WI-FI, ZigBee, or other analogous systems. The Bluetooth modules may also be substituted with bespoke metrology communication modules of the type described in WO2004/057552.

Finally, although measurement apparatus comprising one or more temperature sensors is described above with reference to FIG. 1 to 3, similar measurement apparatus could be provided that collects other types of measurement data. For example, the measurement apparatus may comprise a position measurement probe such as a touch trigger probe or a scanning (also termed analogue) probe. In fact, the measurement apparatus 30 could be replaced with any component from, or to, which data is periodically transferred. For example, the present invention could also be applied to any electronic device (a phone, PDA, laptop etc) that it is wished to activate and transfer data to or from over a wireless radio link.

The invention claimed is:

1. A wireless device comprising:
 a spread spectrum radio-frequency (RF) communications portion for transmitting and/or receiving data using a plurality of frequency channels; and
 an ancillary RF receiver portion for receiving an RF signal across a frequency range that encompasses the plurality of frequency channels used by the spread spectrum radio-frequency (RF) communications portion, the ancillary RF receiver portion including a processor for analyzing the received RF signal to determine when a characteristic RF signal is received, wherein the spread spectrum RF communications portion is activated on receipt of the characteristic RF signal by the ancillary RF receiver portion, the characteristic RF signal includes a plurality of RF pulses of similar duration interspersed with periods of no transmission, a duration of each of the plurality of RF pulses being longer than the periods of no transmission.

2. A device according to claim 1, wherein the ancillary RF receiver portion receives an RF signal across a frequency range that encompasses all of the plurality of frequency channels used by the spread spectrum radio-frequency (RF) communications portion.

3. A device according to claim 1, wherein the spread spectrum radio-frequency (RF) communications portion implements frequency hopping across the plurality of frequency channels.

4. A device according to claim 3, wherein the spread spectrum radio-frequency (RF) communications portion complies with a Bluetooth standard.

5. A device according to claim 1, wherein the ancillary RF receiver portion includes a passive front-end receiver circuit and an amplifier to amplify the received RF signal.

6. A device according to claim 1, wherein the ancillary RF receiver portion draws, in use, a current of less than 500 μA.

7. A device according to claim 1, comprising:
an activation switch; and
a battery, wherein
the battery is connected to the spread spectrum RF communications portion via the activation switch, whereby the ancillary RF receiver portion, on receipt of the characteristic RF signal, provides a control signal that causes the activation switch to close thereby connecting the spread spectrum RF communications portion to the battery.

8. A device according to claim 1, wherein
the spread spectrum RF communications portion and the ancillary RF receiver portion share a common antenna, and
the device further including a signal routing switch for routing any signal received by the common antenna to either the spread spectrum RF communications portion or the ancillary RF receiver portion.

9. A device according to claim 1, wherein the spread spectrum RF communications portion includes a transmit circuit and a receive circuit such that a two-way communications link with a remote interface can be established.

10. A device according claim 9, wherein
the spread spectrum RF communications portion, when active, is switchable between a listening mode in which only the receive circuit is activated and a full communications mode in which both the receive circuit and the transmit circuit are activated, and
the spread spectrum RF communications portion initially enters the listening mode when activated.

11. A device according to claim 1, wherein the spread spectrum RF communications portion is deactivated after a period of non-use.

12. A device according to claim 1, comprising at least one measurement sensor, wherein
the spread spectrum RF communications portion transmits data from the at least one measurement sensor to an associated interface.

13. An interface for communicating with a device according to claim 1, the interface being operable in a spread-spectrum communications mode in which data is transmitted and/or received using the plurality of frequency channels, the interface further being operable in a start mode in which the characteristic RF signal is simultaneously transmitted over the plurality of the frequency channels used in the spread-spectrum communications mode.

14. An interface according to claim 13, further comprising:
a power amplifier wherein,
the power amplifier only boosts a power of the RF signal that is transmitted by the interface when the interface is operating in the start mode.

15. A device according to claim 1, wherein the characteristic RF signal includes a periodically repeating pattern of RF pulses.

16. A kit comprising:
a device according to claim 1, and
an interface for communicating with the device, the interface being operable in a spread-spectrum communications mode in which data is transmitted and/or received using the plurality of frequency channels,
the interface further being operable in a start mode in which the characteristic RF signal is simultaneously transmitted over the plurality of the frequency channels used in the spread-spectrum communications mode.

* * * * *